Figure 1:
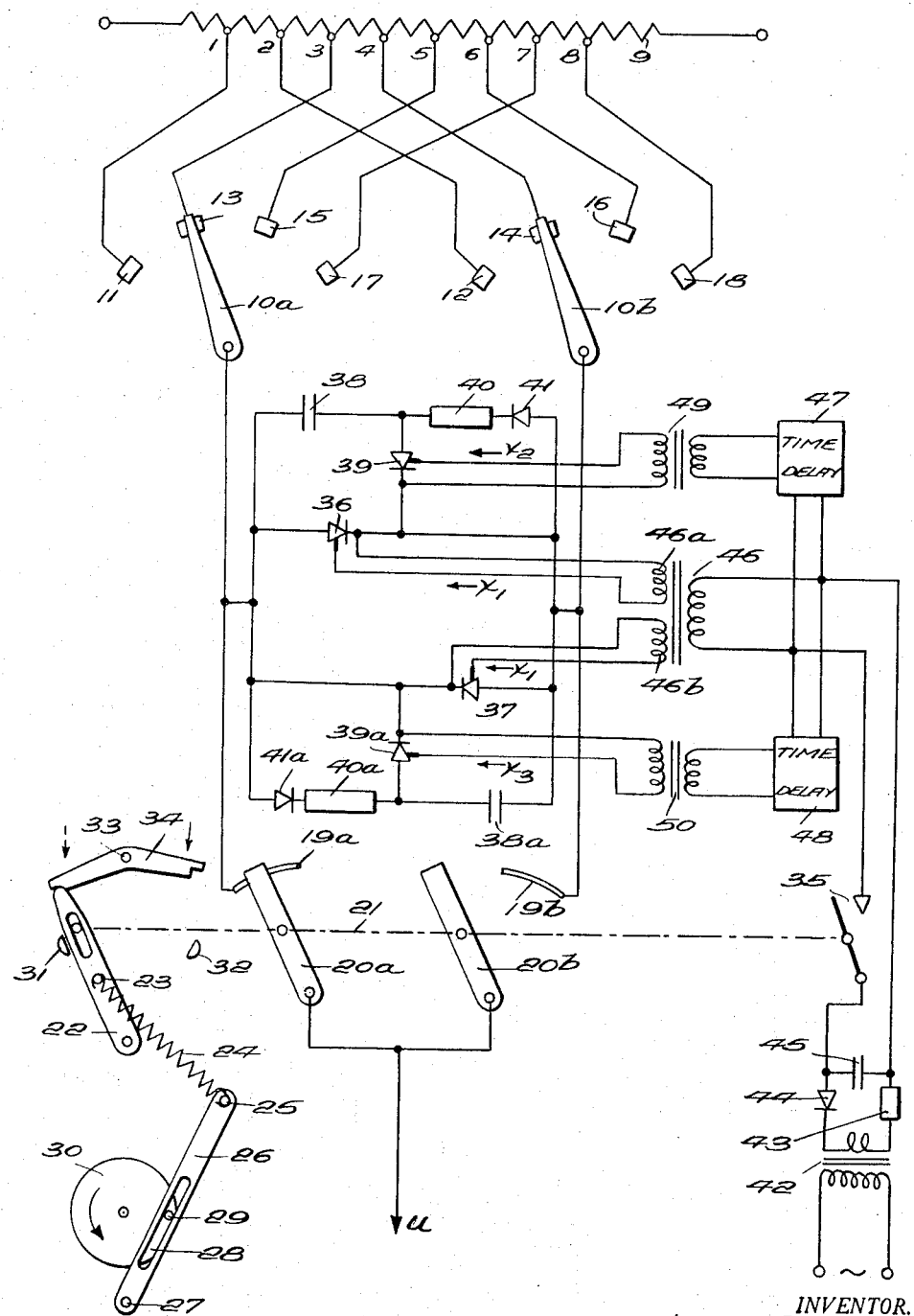

INVENTOR.
Karl Bühler

Dec. 12, 1967     K. BÜHLER     3,358,219
STEP SWITCHING ARRANGEMENT FOR TRANSFORMER WINDING
Filed Aug. 3, 1965     4 Sheets-Sheet 2
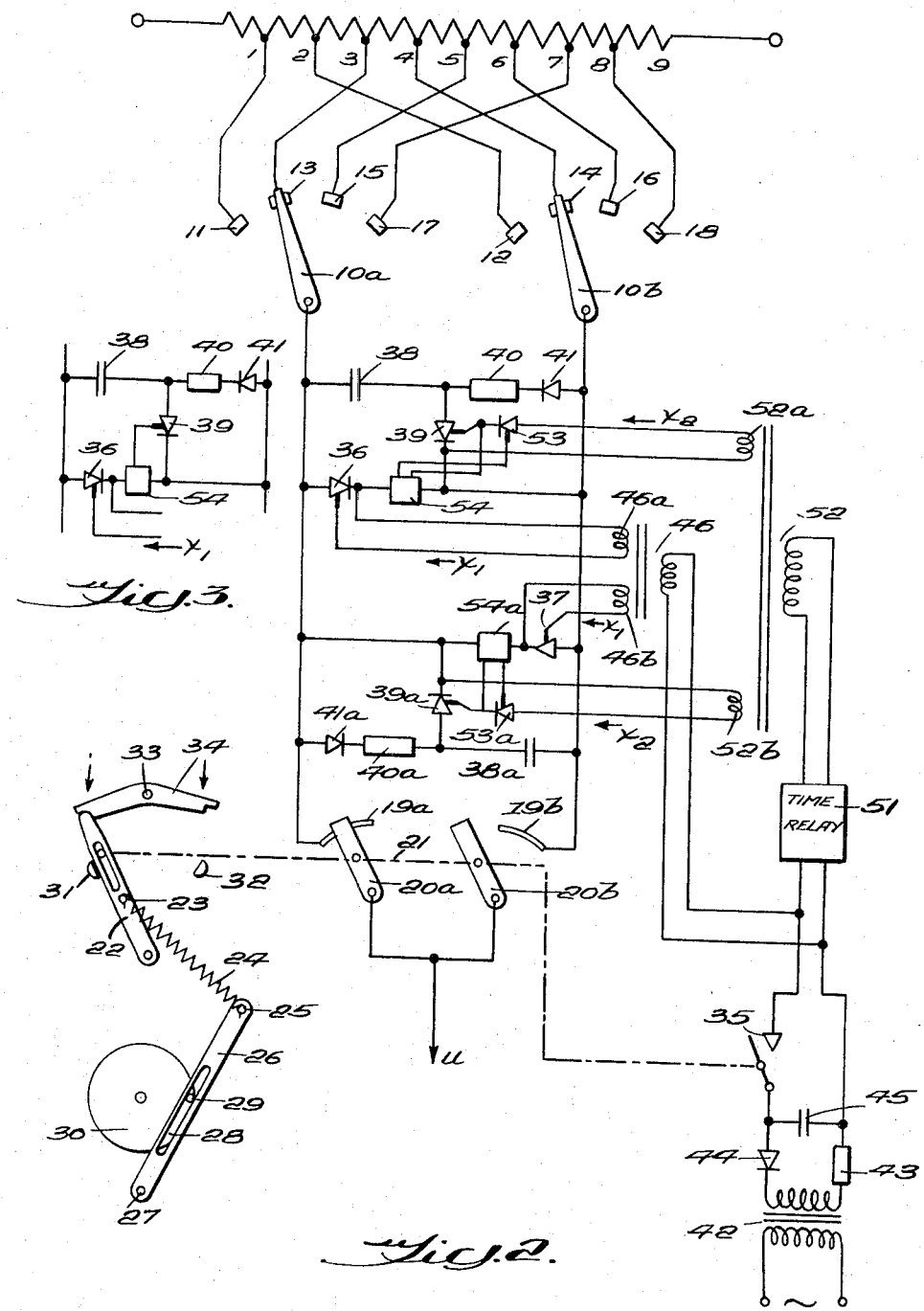
INVENTOR.
Karl Bühler
BY
Pierce, Scheffler & Parker
ATTORNEYS

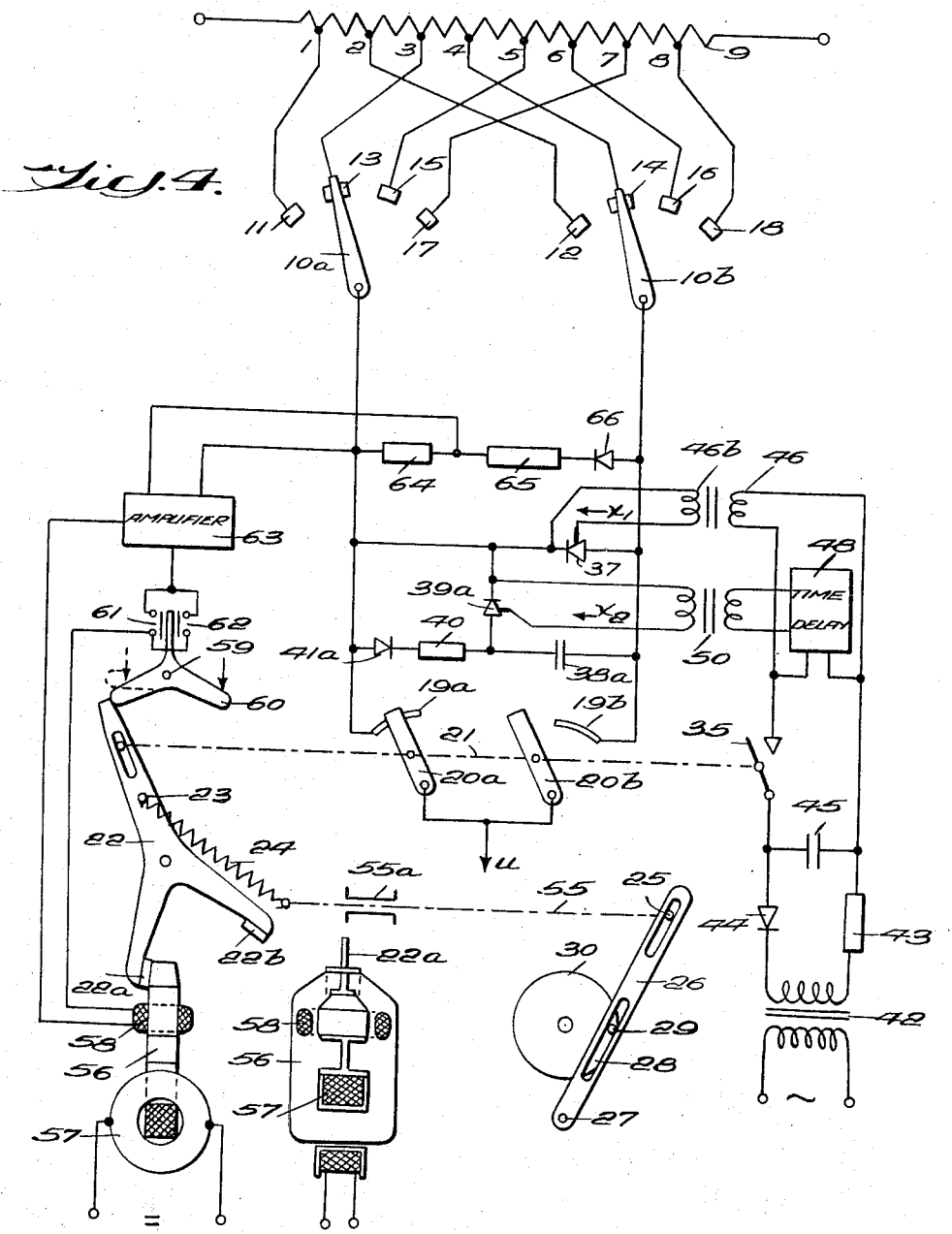

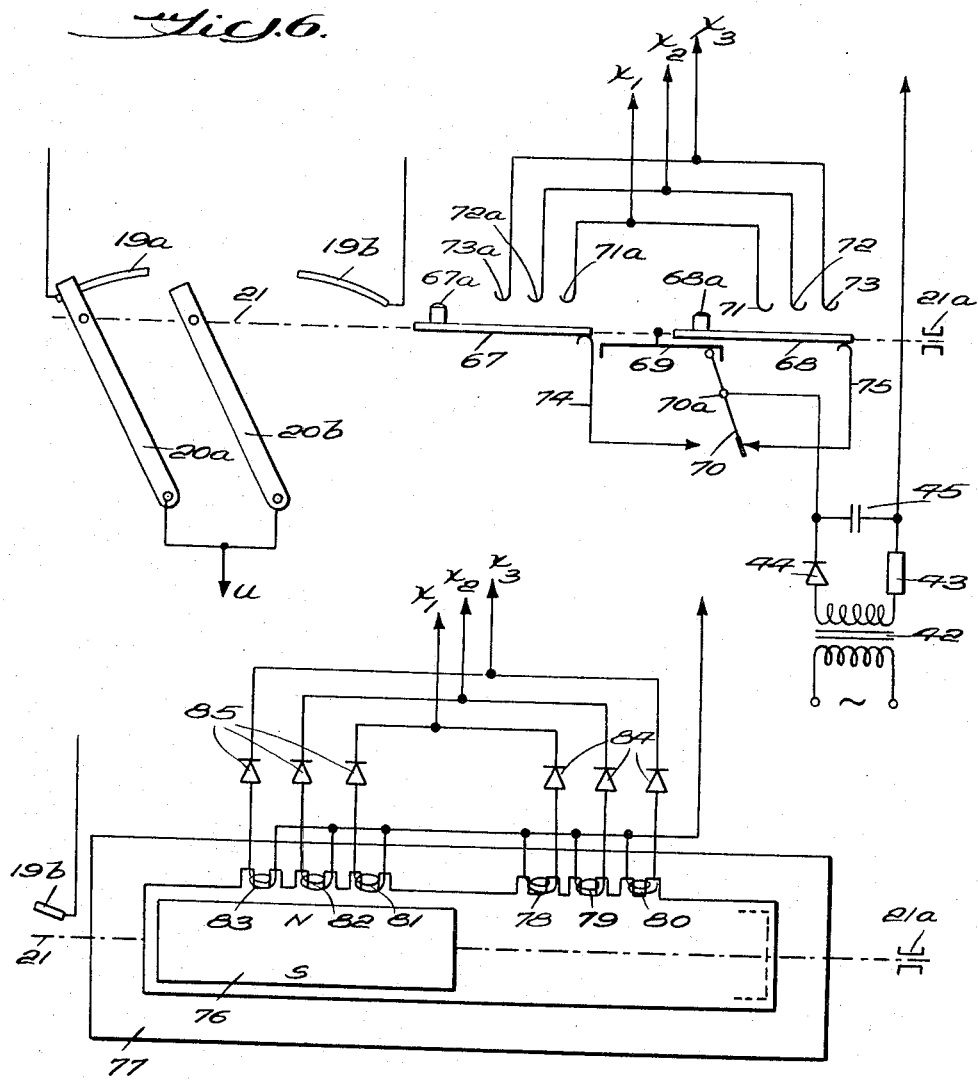

United States Patent Office 3,358,219
Patented Dec. 12, 1967

3,358,219
STEP SWITCHING ARRANGEMENT FOR TRANSFORMER WINDING
Karl Bühler, Nussbaumen, AG, Switzerland, assignor to Aktiengesellschaft Brown, Boveri & Cie, Baden, Switzerland, a joint-stock company
Filed Aug. 3, 1965, Ser. No. 476,840
Claims priority, application Switzerland, Aug. 12, 1964, 10,518/64
7 Claims. (Cl. 323—43.5)

The present invention relates to an arrangement in step switches for transformers for uninterrupted switching under load with the use of mechanical switches and controllable electrical valves.

A device for sparkless load regulation of tap transformers has become known where there are present a step selector and a load switch with a switch-over resistor, grid control tubes participating in the various partial processes of the load switch in such manner that the metal contacts of the load switch close and open without current flow. With this construction it is disadvantageous, however, that the tubes are permanently loaded with the load current of the transformer and must even be rated for occasionally occurring short-circuit currents. The same disadvantages appear in another known device for the regulation of step transformers under load where all, or at least a part, of the mechanical switches otherwise necessary for the operation of the step transformer are replaced by electric valves. Further there is known an arrangement in step switches for transformers for uninterrupted switching under load where a device is used which is permanently connected to the parts to be connected together by the step switch and which absorbs the load current during the switching from one tap to the other, there being provided a gas-filled discharge tube which ignites when it is applied to the line voltage during switching but extinguishes when it is exposed only to the voltage between the taps. Here, however, the mechanical switch must disconnect the current against a recurring voltage which is equal to or greater than the igniting voltage of the tube, so that an arc and burning off are inevitable. Moreover, the discharge tube is under heavy stress during one or more current half-waves, so that such an arrangement is suitable only for small outputs. Finally, also a modification of the last-named arrangement has become known where one discharge vessel is replaced by two oppositely parallel gas or vapor discharge vessels, each with a unidirectional current flow characteristic and with control grids, there being used for the feeding of the control grids either the variation of the voltage at the step switch or a special current source whose current is conducted over a reversing switch controlled by the step switch. But in this case also, the discharge vessels are under heavy stress, in particular upon regulation in case of excess current, since then high voltage drops which require an increased switching output of the discharge vessels occur at the switch-over impedances, e.g. choke coils.

The principal object of the present invention is to provide a simple and inexpensive solution where on the one hand switch-over impedances are avoided and on the other hand the electric valves are loaded only during a small fraction of a half-wave and accordingly can be designed in smaller dimensions.

It is therefore proposed according to the inventon that with the mechanical load reversing switch, at least one controllable electric main valve for the absorption of the step short-circuit current introduced by the load reversing switch during the reversing is connected in parallel, there being arranged in parallel with the electric main valve a series connection consisting of a condenser and a controllable electric auxiliary valve, which permits connecting the condenser parallel to the main valve, and there being provided a control device coupled with the load reversing switch for the generation of igniting pulses which upon reversing bring the electrical main and auxiliary valves temporarily into the conductive stage, in such manner that the step short-circuit current is limited to a fraction of its actually possible maximum value and is subsequently extinguished.

With reference to the drawing, which illustrates examples of construction according to the invention, the latter is explained further in the following. Specifically, FIG. 1 shows an arrangement with two controllable electric main valves arranged anti-parallel to the load reversing switch;

FIG. 2, an arrangement which, compared with that according to FIG. 1, presents a variant with respect to the control device;

FIG. 3, an arrangement according to FIG. 2, but with another construction of the control device;

FIG. 4, an arrangement with only one controllable main valve parallel to the load reversing switch and a controlled magnetic triggering device; while FIG. 5 illustrates a side view of the magnetic triggering device according to FIG. 4.

FIG. 6 shows a device for the generation of igniting pulses by mechanical elements; and FIG. 7, a device for the inductive generation of the igniting pulses.

In FIG. 1, 9 denotes the regulating winding of a transformer having the taps 1 to 8. Taps 1, 3, 5, 7 are connected with the contact studs 11, 13, 15, 17, and taps 2, 4, 6, 8 with the contact studs 12, 14, 16, 18 of the step selector, whose selector arms 10a, 10b are connected with the fixed contact studs 19a, 19b of the load reversing switch. The movable contact studs 20a, 20b of the load reversing switch are coupled together by the drive rod 21, which in turn is articulated at the left end to the drive lever 22. At 23 there engages at lever 22 the spring 24, whose other end is connected at 25 with the tensioning lever 26. The latter is rotatably mounted at 27 and presents the slot 28 into which the follower pin 29 engages, which is firmly connected with the rotatable disk 30. Disk 30 is connected with a drive known in itself and not illustrated in detail, e.g. a motor drive. In the limit positions, which are determined by the abutments 31, 32, the drive lever 22 is retained by a pawl 34 mounted for rotation at 33. The drive rod 21 is articulated at the right end to the auxiliary switch 35 designed as a wiper. In parallel with the load reversing switch 19a, 20a or respectively 19b, 20b are the controllable electric main valves 36, 37, which are advantageously designed as controlled semiconductor rectifiers, with opposite directions of passage. Each main valve 36, 37 is in parallel with a series connection consisting of a condenser 38, 38a and a controllable electric auxiliary valve 39, 39a. Further the condensers 38, 38a are preceded by a series connection consisting of a resistance 40, 40a and rectifier 41, 41a, the rectifiers 41, 41a being anti-parallel with their respective main valve 36, 37.

The power-supply unit, consisting of the transformer 42, resistor 43, rectifier 44 and loading condenser 45, is connected at the output side through the auxiliary switch 35 directly to the isolating transformer 46, whose secondary windings 46a, 46b are connected with the main valves 36, 37. The power-supply unit is further connected through the electric time-delay devices 47, 48 and the isolating transformers 49, 50 with the auxiliary valves 39, 39a. The time-delay devices 47, 48 may be composed in known manner of LC members or be designed, for example, as monostable multivibrators.

The mechanism of the arrangement operates in the following manner: In the illustrated position of the step switch, the regulated voltage $u$ is taken up by the tap 3. Now if it is desired to switch to tap 4, for example, pawl 34 is actuated by any known device in the direction of the solid line arrow, whereby lever 22 is released and begins to rotate clockwise under the action of the tensioned spring 24. Due to the coupling through rod 21, the movable contact studs 20a, 20b are accelerated, 20a running off at great speed from the fixed contact stud 19a, or respectively 20b running onto the contact stud 19b shortly thereafter, whereby a step short-circuit current is initiated. The latter builds up in the circuit including the winding portion between the taps 3 and 4, switches 13/10a, 19a/20a, 20b/19b, 10b/14. At the same time, however, the auxiliary switch 35 firmly coupled with the load reversing switch closes and releases the discharge of the previously charged condenser 45 to the primary winding of the isolating transformer 46 and at the same time also to the time delay devices 47, 48. Through the secondary windings 46a, 46b there is imparted to the two main valves 36, 37 an igniting pulse $x_1$ for each, which brings them into the conducting state. The load reversing switch 19a/20a, 19b/20b is thus bridged by the main valve 36, 37 depending on the momentary polarity of the step voltage between the taps 3, 4, whereat a commutation of the step short-circuit current to the now conducting main valve quickly occurs. For this there suffices the relatively small voltage drop of the arc forming between the two separating contact studs 19a, 20a, because of the low inductivity in the commutation circuit. The contact stud 20b then runs onto the fixed contact stud 19b. The step voltage would now allow the step short-circuit current to rise steeply. In order to limit this current increase immediately, at least the now conducting main valve must be blocked. This is achieved in that the discharge pulse of condenser 45 is transmitted to the controllable auxiliary valves 39, 39a with a given delay by means of the time delay devices 47, 48 and the isolating transformers 49, 50, as igniting pulses $x_2$, $x_3$. The delay between the pulses $x_1$ and $x_2$ or respectively between $x_2$ and $x_3$ is advantageously selected at about 0.2 to 0.4 ms. The shift in time between the pulses $x_2$ and $x_3$ is necessary in order that the discharge of the condensers 38, 38a released by the ignition of the auxiliary valves 39, 39a cannot occur simultaneously, as otherwise equal load voltages with equal potential would act on the cathode and anode sides of the main valves 36, 37, owing to which the intended blocking would be cancelled. The discharge current of the condenser 38, 38a flows counter to the step short-circuit current in the then conducting main valve 36, 37 owing to which a current zero crossing occurs and the main valve is brought into the blocked state. Thereby, the step short-circuit current is limited to a fraction of its otherwise possible maximum value. The charging of the condensers 38, 38a occurs by the step voltage by means of the rectifiers (diodes) 41, 41a and of the resistances 40, 40a. A further step switching, e.g. to tap 5, occurs by wattless switching of the selector arm in known manner to the contact stud 15. Besides, by the drive of the load reversing switch the spring 24 is again tensioned, in that disk 30 is rotated, for example, counter-clockwise, thereby pivoting the tensioning lever 26 by means of the pin 29 into a position mirror-symmetrical to the one shown. The lever 22, which after the last switching operation applies against the right-hand abutment 32, is then retained by the pawl 34. If now pawl 34 is actuated for a new step reversal in the direction of the broken line arrow, the switching process occurs in analogous manner to that described before, simply with reversed functions of the contact studs 20a, 20b of the load reversing switch.

FIG. 2 shows another example of construction, where the mutual shift in time of the igniting pulses for the auxiliary valves 39, 39a is not necessary. The arrangement is essentially the same as in FIG. 1, and for the same parts the same reference characteristics as in FIG. 1 are used. Only instead of the two isolating transformers 49, 50, and of the two time delay devices 47, 48 in FIG. 1, there are present in FIG. 2 an isolating transformer 52 and a time delay device 51. Between the secondary windings 52a, 52b and the auxiliary valves 39, 39a there is inserted an additional controllable electrical auxiliary valve 53, 53a. Further the current path of the main valves 36, 37 contains a circuit element 54, 54a which is advantageously designed as a transducer or resistor, particularly a voltage dependent resistance, and is connected with the anode and control electrode side of the respective auxiliary valve 53, 53a. In this way it is possible to give the igniting pulses $x_2$ from the secondary windings 52a, 52b simultaneously to the auxiliary valves 39, 39a. But only that one becomes operative which is assigned to the main valve 36, 37 just then conducting, as a voltage occurs by the rising step-short-circuit current only over that circuit element 54, 54a which is necessary for the ignition of the respective auxiliary valve 53, 53a, and thus lets the igniting pulse $x_2$ become operative on the particular auxiliary valve 39, 39a. For the rest, the mode of operation of the arrangement in FIG. 2 is fully equivalent to that described under FIG. 1.

Another advantageous design of the arrangement according to FIG. 2, where parts 51, 52, 53 and 53a can be omitted, is possible in that the voltage occurring over the circuit elements 54, 54a is used directly for the control of the auxiliary valves 39, 39a. Such an arrangement is illustrated in FIG. 3, which must otherwise be imagined supplemented according to FIG. 2 with omission of the already mentioned parts 51, 52, 53, 53a. Assuming the main valve 36 represented in FIG. 3 to be just then conducting and traversed by the rising step short-circuit current, according to the momentary polarity of the step voltage, then the voltage occurring at the circuit element 54 is supplied directly to the control electrode of the auxiliary valve 39 and thus the ignition thereof is brought about. For the rest, operation of the arrangement according to FIG. 3 is equivalent to that according to FIG. 2 and FIG. 1.

In the examples according to FIGS. 1 to 3, two antiparallelly connected main valves are correlated with the load reversing switch. This expenditure can be reduced to one main valve if the movement of the load reversing switch is released each time only during half-waves of a polarity of the step voltage corresponding to the flow direction of the main valve. FIGURES 4 and 5 show such an arrangement where compared with that according to FIG. 1 the parts 36, 38 to 41, 46a, 47 and 49 are omitted. The other parts are marked with the same reference symbols insofar as they agree with those of FIG. 1. The drive lever 22 has in this case two legs provided with iron armatures 22a, 22b. The spring 24 is articulated at 25 to the tensioning lever 26 through the rod 55 mounted at 55a. By 56 is designated a magnet body which carries a coil 57 for its permanent excitation. Further, the magnet body 56 is traversed in its upper part by the coil 58, which serves for field attenuation. Coil 58 is connected through the reversing switch 61, 62 with an amplifier 63, in whose input is located a resistor 64, the latter forming together with resistor 65 and rectifier 66 a series connection which is connected in parallel with the main valve 37. The rectifier 66 is so oriented that its direction of passage corresponds to that of the main valve 37. The drive lever 22 is engaged at its upper end by a pawl 60 mounted for rotation about axis 59. The arrangement functions as follows: For switching from tap 3 to tap 4, pawl 60 is acuated clockwise, as indicated by the solid line arrow, by an arrangement known in itself and not shown in detail, and the switching member 62 is closed. However, drive lever 22 is retained by the magnet body 56 by the magnetic armature 22a in the position shown against the already tensioned spring 24 and can release only when the polarity of the step voltage over the rectifiers 66 and voltage divider resistances 64, 65 permits a flow of current and thus the coil 58 produces in the magnet body 56 over the amplifier 63 a sufficient flux attenuation. Assuming that the magnetic release of the drive lever 22 is to occur always at positive half-waves of the step voltage it depends on the inertia of the device whether the initiation of the step short-circuit by the load reversing switch 19a/20a, 19b/20b is to take place at the first or the next following positive half-wave. This can readily be pre-determined by adequate dimensioning of the parts. In this way assurance is given that the step short-circuit current is always initiated with the proper polarity which corresponds to the direction of passage of the main value 37. Further switching occurs analogously as already described under FIG. 1. By the reversing switch 61, 62 provision is made that coil 58 can receive a current pulse for the production of the flux attenuation of the magnet 56, 57 only upon actuation of the pawl 60 in the limit position of the drive lever 22.

The igniting pulses for the main and auxiliary valves may be produced also by means of mechanical elements which are coupled with the load reversing switch in terms of movement. In the example of construction shown in FIG. 6, the load reversing switch 19a/20a, 19b/20b is coupled with the slidable contact studs 67, 68 through the drive rod 21 mounted at 21a; contact studs 67, 68 are provided with contact bosses 67a, 68a which cooperate respectively with the fixed counter wiper contacts 71a to 73a, and 71 to 73. Further, the contact studs 67, 68 have correlated with them wiper contacts 74, 75 which are connected through the reversing switch 70 rotatably mounted at 70a with the power supply unit consisting of the parts 42 to 45 and already described under FIG. 1. With the drive rod 21 there is firmly connected the engaging piece 69 for the actuation of the reversing switch 70. If the load reversing switch 19a/20a, 19b/20b is actuated by means of the drive device consisting of the parts 22 to 34 and indicated in FIG. 1, then upon its pivoting clockwise the contact studs 67, 68 are moved to the right. As soon as it reaches approximately its middle position, discharge pulses of the condenser 45 are given to the lines designated by $x_1$ to $x_3$ by the contact bosses 68a in the desired time sequence. These lines lead to the isolating transformers 46, 49, 50 indicated in FIG. 1, through which the igniting pulses $x_1$ to $x_3$ are supplied to the respective main and auxiliary valves. In this case, the time delay devices 47, 48 included in FIG. 1 may be omitted, as the igniting pulses already have the correct time sequence. By the engaging piece 69 the reversing switch 70 is reversed toward the end of the switching operation, so that during the next switching operation the correct sequence of the igniting pulses is again insured now through the contact boss 67a and the wiper contacts 71a to 73a.

Lastly, the generation of the igniting pulses for the main and auxiliary valves may be effected by inductive means. In the example of construction shown in FIG. 7, the load reversing switch indicated on the left is coupled through the drive rod 21 mounted at 21a with the permanent magnet 76, located within the yoke 77 so as to shift magnet 76 in the yoke. Two groups of three coils 78 to 80, and 81 to 83, respectively, are lodged in recesses of the yoke 77. The coils 78 to 80 are connected through rectifiers 84, and the coils 81 to 83 through rectifiers 85, with the lines designated by $x_1$ to $x_3$. When the load reversing switch is actuated by movement of drive rod 21 and thus the magnet 76 is moved from the position shown toward the right, the right edge of the magnet 76 reaches the coil 78 approximately at the same moment when the load reversing switch reaches its middle position. During the passage of the magnet 76, there is produced in coil 78 a change of flux and hence, a positive current pulse, which is passed through by rectifier 84 and serves as igniting pulse for the main valves (36, 37, FIG. 1), as already described under FIG. 6. In the same manner, during the continued movement of the magnet 76 there are produced in coils 79, 80 successively the igniting pulses for the auxiliary valves. During the movement of the magnet 76 to the right its left edge passes under the coils 83, 82, 81 in succession. The resulting negative current pulses, however, remain without effect on the main and auxiliary valves, since rectifiers 85 block transmission of such pulses. Upon subsequent reversal, whereupon magnet 76 returns from its right limit position, shown in broken lines, to the starting position shown in full lines, the coils and rectifiers interchange their functions. Now, positive current pulses are induced in coils 81 to 83, while the negative pulses induced in coils 80, 79, 78 are blocked by rectifiers 84. The device according to FIG. 7 has the advantage that it can readily be provided at the high voltage portion of the step switch, as it does not require a power supply unit. Naturally, also the other devices for the generation of the igniting pulses may be arranged at the high voltage portion of the step switch, if their power supply unit is fed from the step voltage and connected thereto.

I claim:

1. In a step switching device for changing the taps on a winding of electrical transformers and the like wherein the step switching is made to take place under load, the combination comprising a mechanical switching device connected to and for changing the taps on said winding, a mechanical load reversing switch connected in circuit with said tap changing switching device, at least one controllable electric main valve connected in parallel with said load reversing switch for absorption of the step short-circuit current initiated by the load reversal during switching, a series arrangement of a condenser and controllable electric auxiliary valve connected in parallel with said main valve, and control means for generating ignition pulses for said main and auxiliary valves to render them selectively and temporarily conductive in accordance with the operation of said load reversing switch such as to limit said step short-circuit current to a fraction of its actually possible maximum value and extinguish the same, said control means producing a first ignition pulse to render said main valve conductive to carry said step short-circuit current, and said control means after a time delay further producing a second ignition pulse to render said auxiliary valve conductive thereby to discharge the current stored in said condenser in a direction counter to the direction of current flow through said main valve and effect a blocking of said main valve.

2. A step switching device as defined in claim 1 and which includes a device for re-charging said condenser by said step voltage, said re-charging device comprising a series arrangement of a resistor and rectifier connected in circuit with said condenser, and said rectifier being connected anti-parallel with said main valve.

3. A step switching device as defined in claim 1 wherein said control means generating said ignition pulses for said valves comprises a power source, a power condenser chargeable from said power source, auxiliary switching means actuated together with said load reversing switch to close a discharge circuit from said power condenser through the respective primary windings of a pair of isolating transformers, circuit means connecting the secondary winding of the first of said pair of isolating transformers to the control connection on said main valve to render the same conductive, circuit means connecting the secondary winding of the second isolating transformer to the control connection on said auxiliary valve, and a time delay device interposed in the connections between said power condenser and the primary of said second isolating transformer to postpone ignition of said auxiliary valve until after said main valve has been rendered conductive.

4. A step switching device as defined in claim 1 which includes a pair of controllable electric main valves connected anti-parallel with respect to each other and in parallel with said load reversing switch, there being connected in parallel with each of said main valves a series arrangement of a condenser and a controllable electric auxiliary valve, and wherein said control means generating said ignition pulses for said valves comprises a power source, a power condenser chargeable from said power source, auxiliary switching means actuated together with said load reversing switch to close a discharge circuit from said power condenser through the respective primary windings of three isolating transformers, circuit means connecting secondary windings of a first one of said isolating transformers respectively to the control connections on said main valves to render the same alternatively conductive, circuit means respectively connecting secondary windings of the second and third isolating transformers to the control connections on said auxiliary valves, and time delay devices with different time delay characteristics interposed respectively in the connections between said power condenser and the primary windings of said second and third isolating transformers to postpone ignition of said auxiliary valves until after their respectively associated main valves have been rendered conductive, said different time delay characteristics of said time delay devices serving to prevent simultaneous discharge of said condensers series connected with said auxiliary valves.

5. A step switching device as defined in claim 1 which includes a pair of controllable electric main valves connected anti-parallel with respect to each other and in parallel with said load reversing switch, there being connected in parallel with each of said main valves a series arrangement of a condenser and a controllable electric auxiliary valve, and wherein said control means generating said ignition pulses for said valves comprises a power source, a power condenser chargeable from said power source, auxiliary switching means actuated together with said load reversing switch to close a discharge circuit from said power condenser through the respective primary windings of a pair of isolating transformers, circuit means connecting secondary windings of the first of said pair of isolating transformers respectively to the control connections on said main valves to render the same alternatively conductive, circuit means connecting secondary windings of the second isolating transformer to the control connections respectively on said auxiliary valves, a time delay device interposed in the connections between said power condenser and the primary winding of said second isolating transformer to postpone ignition of said auxiliary valves until after the main valve correlated thereto has been rendered conductive, means connected respectively in series with each of said main valves for producing a control voltage in response to flow of current through the main valve, and means connecting each of said control voltage producing means respectively in the circuits extending from said secondary windings of said second isolating transformer to the control connections on said auxiliary valves for rendering said auxiliary valves selectively conductive dependent upon which of said main valves is in a conductive state.

6. A step switching device as defined in claim 1 wherein said control means for generating said ignition pulses for said main and auxiliary valves comprises mechanical switching means actuated together with said mechanical load reversing switch, said mechanical switching means being interposed between said control connections on said main and auxiliary valves and the discharge circuit of a periodically recharged power condenser.

7. A step switching device as defined in claim 1 wherein said control means for generating said ignition pulses for said main and auxiliary valves comprises a magnet and coil means inductively coupled therewith, means for producing relative movement between said magnet and coil means together with movement of said mechanical load reversing switch to induce sequential voltage impulses in said coil means, and circuit means connecting said coil means respectively to said control connections on said main and auxiliary valves.

References Cited

UNITED STATES PATENTS

| | | | |
|---|---|---|---|
| 3,263,157 | 7/1966 | Klein | 323—22 |
| 3,319,153 | 5/1967 | Livington | 323—43.5 |

FOREIGN PATENTS 936,713  11/1963  Great Britain.

JOHN F. COUCH, *Primary Examiner.*

W. E. RAY, *Assistant Examiner.*